United States Patent
Ho

(10) Patent No.: US 6,910,782 B2
(45) Date of Patent: Jun. 28, 2005

(54) COMBINED FRAME AND BACK LIGHT MODULE

(75) Inventor: Yi-Chun Ho, Taipei (TW)

(73) Assignee: Quanta Display Inc., Taoyuan (TW)

( * ) Notice: Subject to any disclaimer, the term of this patent is extended or adjusted under 35 U.S.C. 154(b) by 0 days.

(21) Appl. No.: 10/250,287

(22) Filed: Jun. 20, 2003

(65) Prior Publication Data

US 2004/0170010 A1 Sep. 2, 2004

(30) Foreign Application Priority Data

Feb. 27, 2003 (TW) .......................... 92104142 A

(51) Int. Cl.[7] .............................................. F21V 7/04
(52) U.S. Cl. ........................... 362/31; 362/26; 362/368; 349/58
(58) Field of Search .............................. 362/26, 27, 30, 362/31, 368, 378; 349/58, 61

(56) References Cited

U.S. PATENT DOCUMENTS 5,537,296 A * 7/1996 Kimura et al. ................ 362/31
6,386,722 B2 * 5/2002 Okumura ...................... 362/31
6,452,821 B1 * 9/2002 Liao .......................... 363/146

* cited by examiner

Primary Examiner—John Anthony Ward
(74) Attorney, Agent, or Firm—Jianq Chyun IP Office

(57) ABSTRACT

A combined frame for housing at least a lamp with one end connected to a power cord is provided. The combined frame comprises a lower frame and an upper frame. The lamp is positioned between the upper frame and the lower frame. The lower frame has an angled cable groove that encloses the power cord from the lamp. One end of the power cord is exposed outside the lower frame. The upper frame is positioned over the lower frame. Through the angled cable groove, the power cord is prevented from sliding in the axial direction of the lamp by any unintended external force and hence pulling power cable away from the lamp. This invention also provides a back light module comprising a light-guiding plate and the aforementioned lamp and combined frame.

11 Claims, 5 Drawing Sheets

COMBINED FRAME AND BACK LIGHT MODULE

CROSS REFERENCE TO RELATED APPLICATIONS

This application claims the priority benefit of Taiwan application Ser. No. 92104142, filed Feb. 27, 2003.

BACKGROUND OF INVENTION

1. Field of Invention

The present invention relates to a combined frame and a back light module. More particularly, the present invention relates to a combined frame capable of fastening the power cord of a lamp and preventing the solder joints joining the power cord and the lamp from loosening up and a back light module deploying the combined frame.

2. Description of Related Art

Thanks to the many breakthroughs in semiconductor technologies and the introduction advanced display devices, multi-media have been developed at an exceedingly fast pace. In the past, cathode ray tube (CRT) was almost the only commercially available display device due to its superb quality and low price. However, with the advent of personal computers, other factors related to a display device such as spatial occupation, power consumption and environmental safety become important considering factors. Because CRT is basically a bulky and power gusting device, it has been gradually replaced by radiation free, high image quality, slim and power efficient displays such as liquid crystal displays (LCD).

FIG. 1 is a diagram showing the structural layout of a conventional back light module. As shown in FIG. 1, the back light module 100 comprises light-guiding plate (LGP) 110, a lamp 120, a reflector 130, an optical film 140 and a combined plastic frame 200. The light-guiding plate 110 furthermore comprises a light-incidenting surface 112, a light-diffusing surface 114 and a light-emitting surface 116. The lamp 120 is set up next to the light-incidenting surface 112 of the light-guiding plate 110. Light from the lamp 120 enters the light incidenting surface 112 of the light-guiding plate 110 to be diffused and reflected by the light-diffusing surface 114. Finally, the diffused and reflected light leaves the light-guiding plate 110 through the light-emitting surface 116. In other words, the light-guiding plate 110 is capable of transforming linear light rays from the lamp 120 into a planar light source for illuminating the entire surface of a liquid crystal panel (not shown) uniformly.

The reflector 130 is positioned on one side enclosing the lamp 120 so that light emitted from the lamp 120 is concentrated towards the light-incidenting surface 112 of the light-guiding plate 110. The optical film 140 is positioned above the light-emitting surface 116 of the light-guiding plate 110 for increasing luminance of the back light module 100.

The combined frame 200 comprises of an upper frame 210 and a lower frame 220. The lower frame 220 supports the light-guiding plate 110, the lamp 120 and the reflector 130. The sidewall 222 of the lower frame 220 furthermore comprises a plurality of protrusions 224. The upper frame 210 has a plurality of fasteners 212 that corresponds in position to the protrusions 224. Each fastener 212 has an opening 214 suitable for fastening with a protrusion 224 so that the upper frame 210 and the lower frame 220 are tightly engaged together. In addition, the upper frame 210 has a window 216 for exposing the light emitted from the light-emitting surface 116 of the light-guiding plate 110 so that a liquid crystal panel (not shown) above the upper frame 210 is illuminated by a planar light source. In brief, through the engagement of the upper frame 210 and the lower frame 220, the light-guiding plate 110, the lamp 120 and the reflector 130 are bound together into an integrative back light module 100.

FIGS. 2A and 2B are diagrams showing the outlet end of a lamp-linked power cord in a conventional back light module. As shown in FIGS. 2A and 2B, one end of the lamp 120 resting on the lower frame 220 is often soldered to a power cord 122. The power cord 122 emerging from the back light module 100 is usually connected to a bias voltage so that the lamp 120 is powered. Furthermore, a stationing block 226 having a cable groove 228 is attached to one side of the lower frame 220. The power cord 122 is buried inside the cable groove 228 so that the other end of the power cord 122 is exposed outside the lower frame 220. In addition, the upper frame 210 also has a cover plate 218 that covers the stationing block 226 when the upper frame 210 and the lower frame 220 are fastened together through the fasteners 212 and the protrusions 224.

Since the cable groove 228 in a conventional stationing block 226 has a straight design, the following defects are produced: 1. With a straight cable groove design, the power cord inside the cable groove is free to slide in the axial direction of the lamp and often leads to a shift in the power cord position. 2. With a straight cable groove design, the power cord inside the cable groove is often subjected to unintended jerking forces while the module is being assembled or tested. Consequently, the soldering points may loosen up or be exposed resulting in current leakage. If the power cord is pulled too hard, the solder joint may break apart leading to lamp failure.

SUMMARY OF INVENTION

Accordingly, one object of the present invention is to provide a combined frame and a back light module capable of stationing the position of a power cord and preventing any external forces from shifting the power cord, loosening up or exposing solder joints.

To achieve these and other advantages and in accordance with the purpose of the invention, as embodied and broadly described herein, the invention provides a combined frame for supporting at least a lamp with one end connected to a power cord. The combined frame comprises a lower frame and an upper frame. The lower frame has an angled groove for housing the power cord from the lamp such that one end of the power cord is exposed outside the lower frame. The upper frame engages with the lower frame above the lower frame.

This invention also provides a back light module. The back light module comprises a light-guiding plate, at least a lamp and a combined frame. The light-guiding plate has at least a light-incidenting surface, at least a light-diffusing surface and a light-emitting surface. One end of the lamp is connected to a power cord. The lamp is positioned on one side of the light-incidenting surface. The lamp provides a beam of light to the light-incidenting surface of the light-guiding plate. After passing through the light-diffusing surface, the light travels on to the light-emitting surface and emerges from the light-guiding plate. The combined frame comprises a lower frame and an upper frame. The lower frame has an angled groove for housing the power cord from the lamp such that one end of the power cord is exposed outside the lower frame. The upper frame engages with the lower frame above the lower frame. The upper frame also has a window for exposing the light emerging from the light-emitting surface of the light-guiding plate.

According to one embodiment of this invention, the lower frame has a stationing block. The angled groove is located inside the stationing block. The upper frame has a cover plate for covering the stationing block. In addition, the angled groove has one or a multiple of corners. The corner can be a right-angled corner, an acute corner or an obtuse corner. Moreover, the angled groove has a plurality of position-limiting projections for restraining the movement of the power cord.

According to one embodiment of this invention, the sidewall of the frame has a plurality of protrusions and the upper frame has a plurality of fasteners that correspond in position to the respective protrusions. Each fastener has an opening for engaging with a protrusion so that the upper frame and the lower frame can be fastened together through the fasteners and the protrusions. Furthermore, each protrusion has a slant surface for guiding the fasteners over the block so that the opening on the fastener can click onto the protrusion with ease.

According to one embodiment of this invention, an optical film is also formed on the light-emitting surface of the light-guiding plate for increasing the luminance of the back light module. In addition, a reflector is stalled on one side of the lamp. The reflector encloses the lamp so that light emitted from the lamp is concentrated towards the light-incidenting surface of the light-guiding plate. Moreover, a reflective plate is installed at the bottom of the light-guiding plate for increasing the reflectivity and diffusive strength of the light-diffusing surface of the light-guiding plate. Therefore, overall utilization of light in the back light module is increased.

In this invention, a cable groove having one or a multiple of angled corners are used to house the power cord of the lamp. The angled groove design restrains the movement of the power cord so that the power cord is prevented from sliding in the axial direction of the lamp within the groove. Furthermore, any unintended external force pulling at the end of the power cable is transmitted to the corner regions only. Hence, the solder joint connecting the power cord to the lamp is prevented from pulling loose or breaking away from the lamp.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
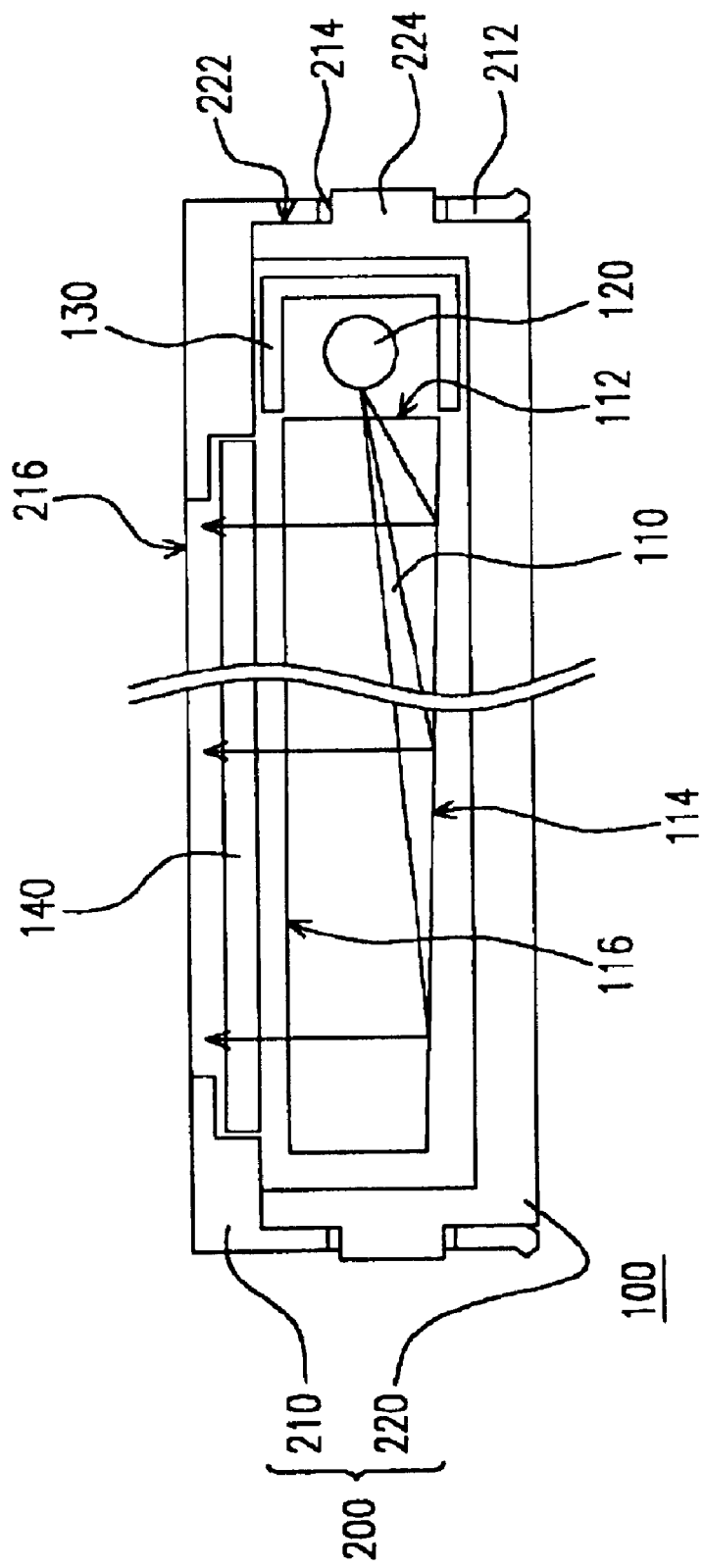
FIG. 1 is a diagram showing the structural layout of a conventional back light module.
Figure 2B:
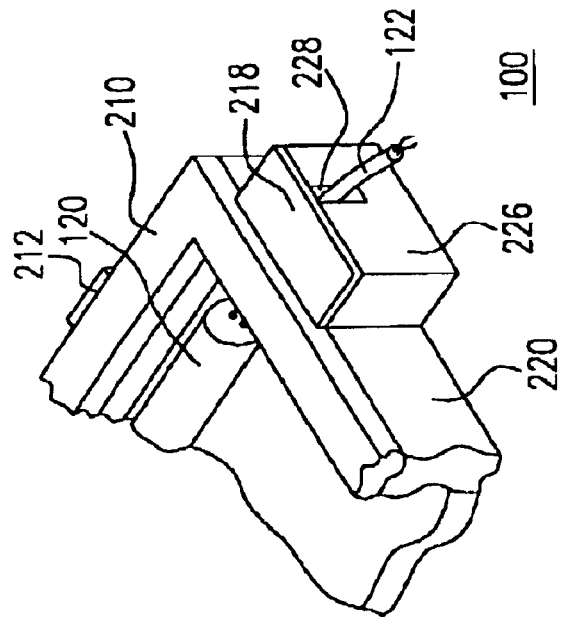
FIGS. 2A and 2B are diagrams showing the outlet end of a lamp-linked power cord in a conventional back light module.
Figure 2A:
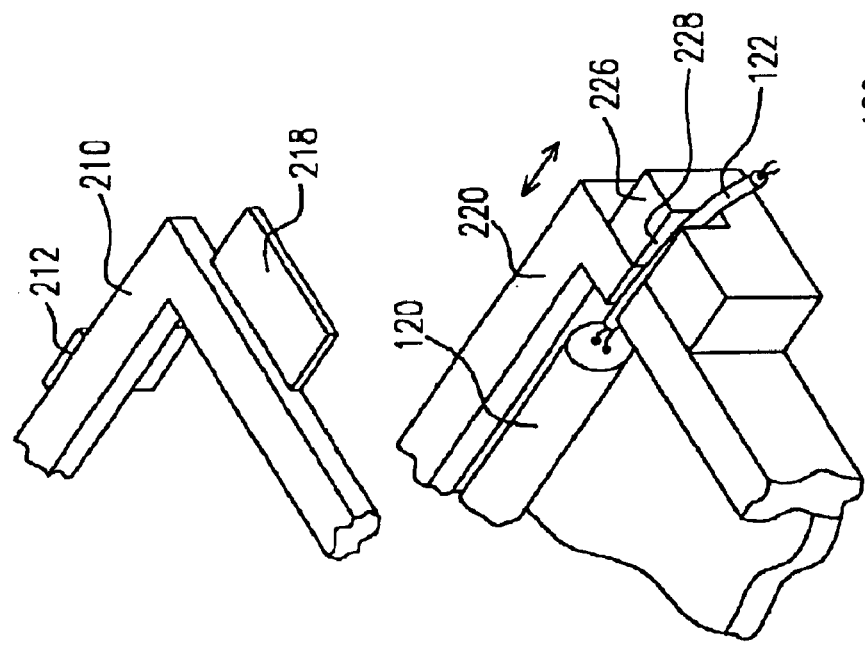

Reference will now be made in detail to the present preferred embodiments of the invention, examples of which are illustrated in the accompanying drawings. Wherever possible, the same reference numbers are used in the drawings and the description to refer to the same or like parts.

Figure 3:
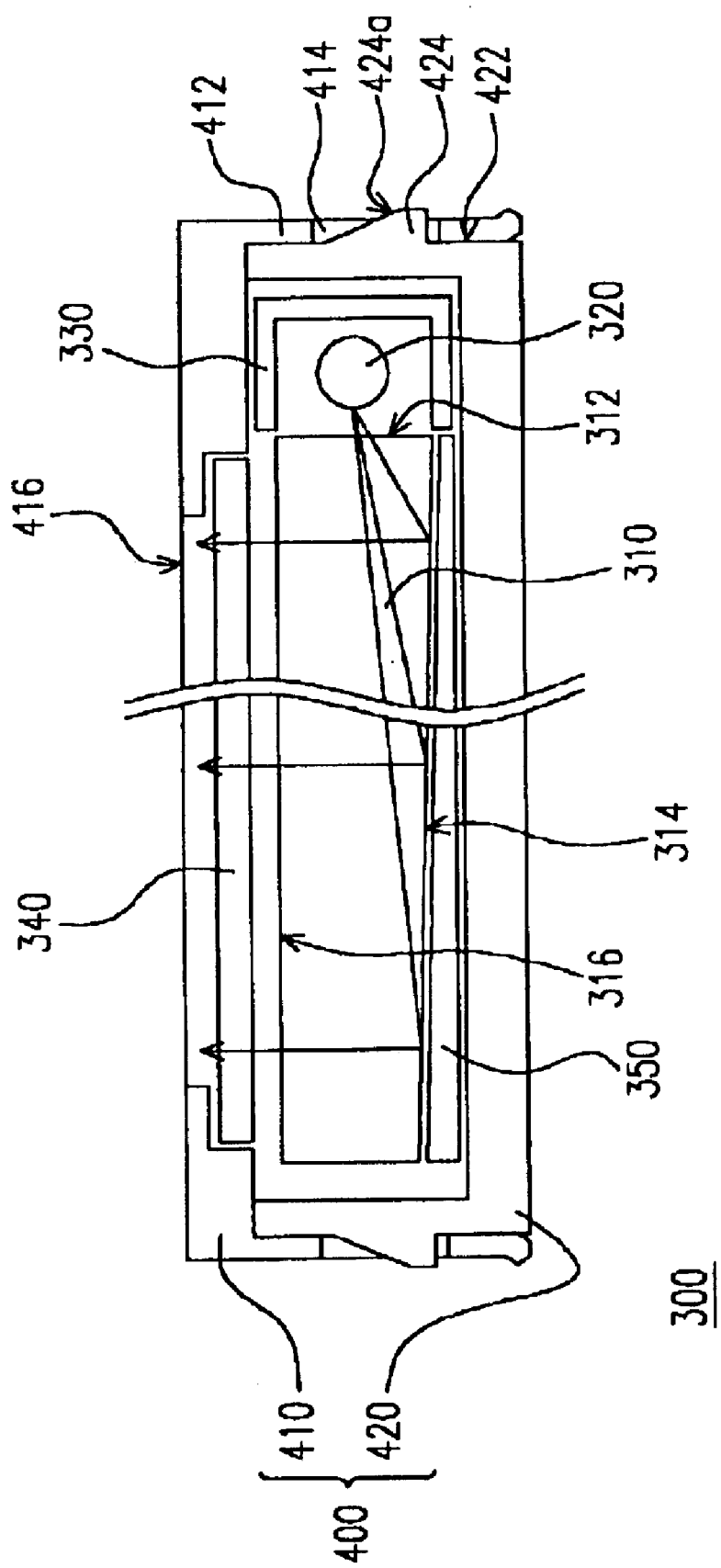
FIG. 3 is a diagram showing the structural layout of a back light module according to one preferred embodiment of this invention.

FIG. 3 is a diagram showing the structural layout of a back light module according to one preferred embodiment of this invention. As shown in FIG. 3, the back light module 300 comprises a light-guiding plate 310, a lamp 320, a reflector 330, an optical film 340, a reflective plate 350 and a combined frame 400. The light-guiding plate 310 has a light-incidenting surface 312, a light-diffusing surface 314 and a light-emitting surface 316. The light-diffusing surface 314 has a plurality of V-shaped notches or a plurality of recess points (not shown). The lamp 320 is, for example, a cold cathode fluorescent lamp (CCFL) installed on one side of the light-incidenting surface 312 of the light-guiding plate 310. Light emitted from the lamp 320 enters the light-incidenting surface 312 of the light-guiding plate 310 and then get diffused or reflected by the light-diffusing surface 314 before emerging from the light-emitting surface 316. Therefore, the light-guiding plate 310 coverts the light emitted from the lamp, which is a linear light source, to a planar light source so that a liquid crystal panel (not shown) is uniformly illuminated.

The reflector 330 is installed on one side enclosing the lamp 320. The reflector 330 concentrates the light from the lamp 320 towards the light-incidenting surface 213 of the light-guiding plate 210. The optical film 340 is positioned over the light-emitting surface 316 of the light-guiding plate 310 for increasing luminance level of the back light module 300. The reflective plate 350 is installed at the bottom of the light-guiding plate 310 for increasing the reflectivity and diffusive strength of the light-diffusing surface 314 and hence improves overall utilization of light in the back light module 300. In other words, the reflector 330, the optical film 340 and the reflective plate 350 together provides a planar light source that improves the luminance level and hence the resolution of the liquid crystal display.

The combined frame 400 is a carrier for holding the light-guiding plate 310, the lamp 320 and the reflector 330. The combined frame 400 comprises of an upper frame 410 and a lower frame 420. The sidewall 422 of the lower frame 420 has a plurality of protrusions 424 and the upper frame 410 has a plurality of corresponding fasteners 412. Each fastener 412 has an opening 414 for fastening with a protrusion 424 so that the upper frame 410 and the lower frame 420 are tightly meshed together. In addition, each protrusion 424 has a slant surface 424a for guiding the fastener 412 over the slant surface 424a so that the opening in the fastener 412 and the protrusion 424 can easily fasten with each other. Furthermore, the upper frame 410 has a window 416 for exposing the light-emitting surface 316 of the light-guiding plate 310 so that the planar light source emerging from the light-emitting surface 316 can pass on to the liquid crystal display (not shown) over the upper frame 410.

In short, the combined frame 400 formed by meshing the upper frame 410 with the lower frame 420 also fixes the relative positions of the light-guiding plate 310, the lamp 320 and the reflector 330 so that an integrative back light module 300 is produced.

Figure 4B:
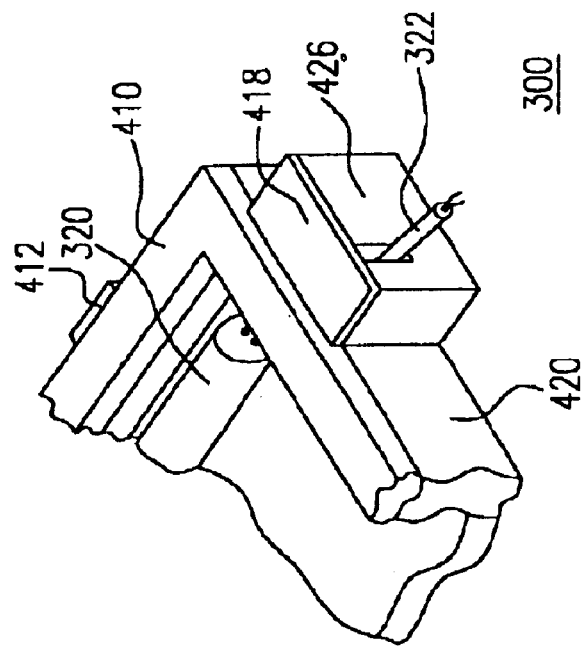
FIGS. 4A and 4B are diagrams showing the outlet end of a lamp-linked power cord according to one preferred embodiment of this invention.
Figure 4A:
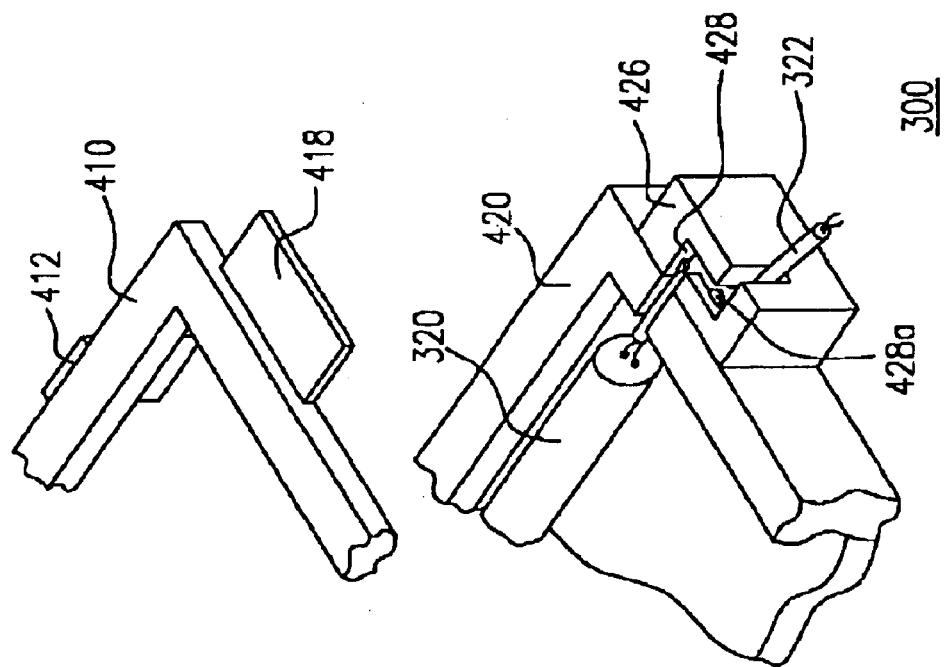

FIGS. 4A and 4B are diagrams showing the outlet end of a lamp-linked power cord according to one preferred embodiment of this invention. As shown in FIGS. 4A and 4B, one end of the lamp 320 resting on the lower frame 420 is often soldered to a power cord 322. The power cord 322 emerging from the back light module 300 is usually connected to a bias voltage so that the lamp 320 is powered. Furthermore, a stationing block 426 having an angled cable groove 428 is attached to one side of the lower frame 420. The power cord 322 is buried inside the angled cable groove 428 so that the other end of the power cord 322 is exposed outside the lower frame 420. In addition, the upper frame 410 also has a cover plate 418 that covers the stationing block 426 when the upper frame 410 and the lower frame 420 are fastened together through the fasteners 412 and the protrusions 424.

As shown in FIG. 4A, the angled cable groove 428 has two corners (that is, the groove 428 bends twice). The corners are right-angled bends. When the power cord 322 is enclosed within the angled cable groove 428, the power cord 322 is prevented from moving in the axial direction of the lamp 320 by the corners. Moreover, the angled cable groove 428 may have additional position-limiting bumps 428a pressing against the side of the power cord 322 further limiting any movements. Due to the bending corner design of the cable groove 428, any unintended external forces at the end of the power cord 322 will be applied to the corner region instead of acting directly on the solder joint between the power cord 322 and the lamp 320. In other words, the solder joint between the power cord 322 and the lamp 320 is prevented from pulling loose, exposing or breaking away.

Figure 5A:
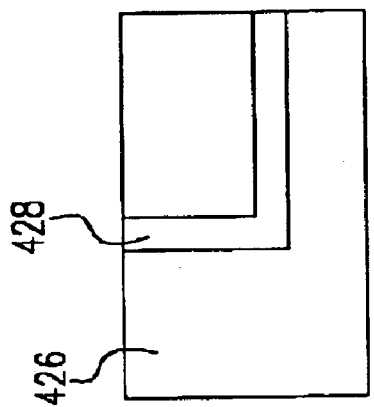
FIGS. 5A to 5C are top views showing a few angled grooves designed according to the preferred embodiment of this invention.
Figure 5B:
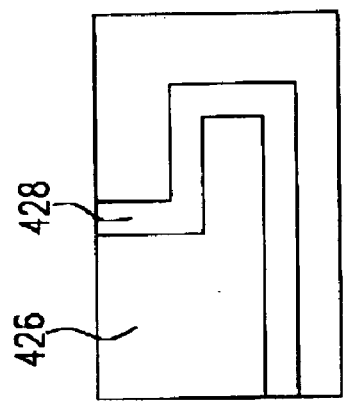
Figure 5C:
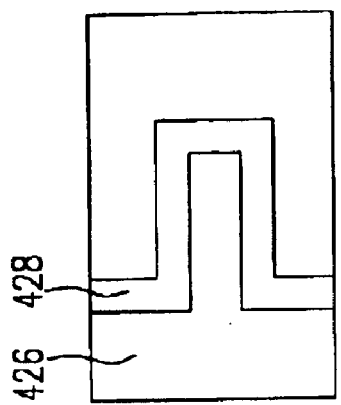

FIGS. 5A to 5C are top views showing a few right-angled grooves designed according to the preferred embodiment of this invention. As shown in FIGS. 5A to 5C, the angled cable groove 428 inside the stationing block 426 is not limited to the design in FIG. 4A with two right-angled corners. For example, the angled cable groove 428 may be designed to have a single corner (as shown in FIG. 5A), a total of three corners (as shown in FIG. 5B) or a total of four corners (as shown in FIG. 5C). Similarly, cable bumps (not shown) can be fitted inside the angled cable groove 428 to restrain the power cord 322.

In this embodiment, the angled cable groove is shown to have right-angled corners. However, other types of corners can be used as well. For example, an acute corner or an obtuse corner or corners with other geometric shapes that can restrain the movement of a power cable can be used.

In addition, the combined frame according to this invention is applied to a back light module for positioning a lamp, a reflector and a light-guiding plate and fixing a power cable attached to the lamp. Obviously, the applications of the combined frame are not limited to a back light module. The combined frame can also be used to house a modular light source having one or a multiple of lamps therein and stationing the power cord within.

In summary, the combined frame and back light module of this invention has at least the following advantages: 1. In this invention, the power cord leading from the lamp is housed inside grooves within the lower having one or a multiple of corners. The angled groove design restrains the movement of the power cord so that the power cord is prevented from sliding in the axial direction of the lamp inside the groove. 2. With an angled cable groove in the lower frame, any unintended external force pulling at one end of the power cord is transmitted to the corner regions only. Hence, the solder joint connecting the power cord to the lamp is protected.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A back light module, comprising:
    a light-guiding plate having at least a light-incidenting surface, at least a light-diffusing surface and a light-emitting surface;
    at least a lamp with one end connected to a power cord, wherein the lamp is installed on one side of the light-incidenting surface so that light emitted from the lamp travels to the light-incidenting surface of the light-guiding plate, passes through the light-diffusing surface and emerges from the light-guiding plate via the light-emitting surface;
    a combined frame for supporting the light-guiding plate and the lamp, the combined frame-comprising:
        a lower frame having an angled cable groove, wherein the power cord is enclosed within the angled cable groove such that the end of the power cord is exposed outside the lower frame; and
        an upper frame positioned over the lower frame, wherein the upper frame has a window for exposing the light-emitting surface of the light-guiding plate.

2. The back light module of claim 1, wherein the lower frame furthermore comprises a stationing block such that the angled cable groove is formed inside the stationing block.

3. The back light module of claim 2, wherein the upper frame furthermore comprises a cover plate such that the cover plate covers the top section of the stationing block.

4. The back light module of claim 1, wherein the angled cable groove has at least an angled corner.

5. The back light module of claim 4, wherein the corner of the angled cable groove is selected from a group consisting of a right corner, an acute corner and an obtuse corner.

6. The back light module of claim 1, wherein the interior of the angled cable groove furthermore has a plurality of bumps for restraining any movement in the power cord.

7. The back light module of claim 1, wherein the sidewalls of the lower frame furthermore have a plurality of protrusions and the upper frame furthermore has a plurality of corresponding fasteners each with an opening thereon so that each protrusion can fasten onto the opening of a corresponding fastener so that the upper frame and the lower frame are fastened together.

8. The back light module of claim 7, wherein each protrusion furthermore has a slant surface for guiding the fastener so that the opening in the fastener can smoothly click onto the protrusion.

9. The back light module of claim 1, wherein the module furthermore comprises an optical film positioned over the light-emitting surface.

10. The back light module of claim 1, wherein the module furthermore comprises a reflector positioned on one side of the lamp but enclosing the lamp.

11. The back light module of claim 1, wherein the module furthermore comprises a reflective plate positioned at the bottom of the light-guiding plate.

* * * * *